Nov. 7, 1933.  S. G. GORDON  1,934,421
FLUOROSCOPE
Filed May 21, 1931
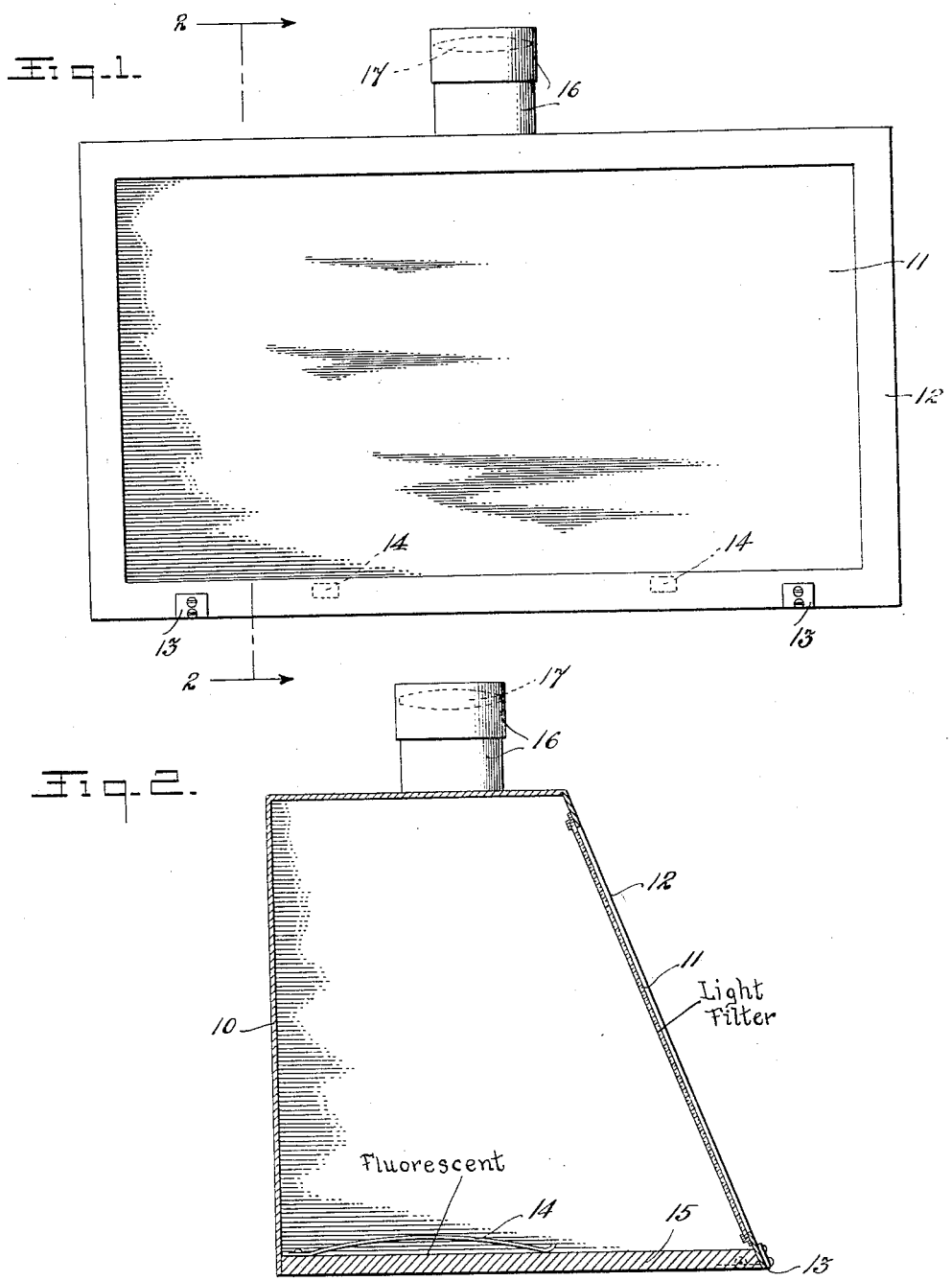
INVENTOR
Samuel G. Gordon
BY Joshua R. H. Potts
HIS ATTORNEY Patented Nov. 7, 1933

1,934,421

UNITED STATES PATENT OFFICE 1,934,421

FLUOROSCOPE

Samuel G. Gordon, Philadelphia, Pa.

Application May 21, 1931. Serial No. 538,929

1 Claim. (Cl. 250—34)

This invention relates to fluoroscopes, and has for an object to provide improved means for testing and taking advantage of the existence of ultraviolet rays for various purposes.

It is well known that there are at present available, a number of different substances which are light filters segregating and transmitting therethrough ultraviolet rays only. There are also well known substances which, when subjected to the influence of ultraviolet rays, fluoresce.

An object of the present invention is to provide improved means for detecting the presence of ultraviolet rays in incident light.

A further object of the invention is to provide improved means for supporting and scanning an object while subjected to ultraviolet rays.

It is well known that many objects fluoresce when subjected to ultraviolet rays, and the fluorescence varies according to the material, and the condition of the material, so that an examination of an object subjected to ultraviolet rays will, by its fluorescent appearance, indicate certain conditions inherent in or upon the objects scanned.

It is an object of the present invention, therefore, to provide a device which will properly position an object for scanning simultaneous to the action of ultraviolet rays so that the fluorescence of the objects scanned may be visible to the observer.

The invention, therefore comprises a camera, one side of which is a light screen transmitting ultraviolet rays only, one side provided with an observation port properly provided with a lens, means within the camera for exhibiting fluorescence when subjected to ultraviolet rays, and means for holding an object in the ultraviolet rays, and in position for inspection.

The invention is directed to other objects, and possesses other features of novelty and advantage, some of which, together with the foregoing, will be hereinafter more fully set forth.

In the drawing:—

Figure 1 is a view of the improved fluoroscope in front elevation, and

Figure 2 is a vertical sectional view, as indicated at Figure 1.

Like characters of reference indicate corresponding parts throughout the several views.

The improved fluoroscope, which forms the subject matter of this application comprises a housing, or box like structure 10, which may be of any size, shape and material. Necessarily, it will be constructed light tight and dead black upon the interior. One side of the box, which may be referred to as the front, is preferably constructed at an inclination and is provided with a light filter 11.

This light filter is a material already well known, such as will segregate and transmit ultraviolet rays only. This light filter is preferably carried by a frame 12, and arranged by means of hinges 13, or the like, so that the front may be opened for the insertion of articles within the housing. Within the housing, spring clips 14 are provided which will serve to hold articles upon the bottom 15, of the camera.

At such a position relative to the light filter 11, as will give best results as for instance the top of the housing, a telescoping tube 16 is mounted, carrying a lens 17 therein. The telescoping tube 16 is the most rudimentary type of apparatus for adjusting the focus of the lens, but it is to be understood, that any other means is within the scope of the invention.

The spring clips 14 are preferably coated upon the top surface with a fluorescent material, several of which are well known at the present time, materials which fluoresce upon subjecting to ultraviolet rays.

The device may be used for detecting the presence of ultraviolet rays in incident light by merely positioning the device to receive the light upon the light filter 11. The/any ultraviolet rays contained in the incident light will, therefore, be projected upon the spring clips 14, and by reason of their fluorescent coating, such clips will be caused by the incident violet rays to fluoresce. The character of the fluorescence, by a little practice, will determine the prevalance of ultraviolet rays in the incident light.

As an example of another use, the examination of checks or other bills of exchange may be cited to determine whether or not such checks have been raised or otherwise tampered with. Paper of various types and inks employed upon papers have characteristic fluorescent properties, and when subjected to ultraviolet rays, will fluoresce in accordance with their individual characteristics. The mutilation of paper by rubbing or other attack will change the character of the fluorescence and different inks will have different fluorescent properties so that in case of another ink being employed, the two inks will have different fluorescent characteristics all of which will be easily determined by one scanning the check through the lens 17.

Many other uses for the device will be found—among those are the examination of precious stones. In the use of the device for examining such articles, the article is first placed within the camera, and the light screen closed, shutting out all light rays. The device is then turned until (preferably) sun light falls full upon the light filter. By examination through the observation tube, the character of the fluorescence of the clips 14 will indicate the full intensity of the sun light upon the light filter as providing the maximum ultraviolet rays within the camera. When such full affect has been attained, the device is at its maximum efficiency in the examination of articles.

Of course, the fluoroscope, herein illustrated, may be modified in various ways without departing from the invention herein set forth and hereinafter claimed.

The invention is hereby claimed as follows:

A fluoroscope comprising a housing, a base, a light filter forming a part of the housing and inclined over the base, said filter transmitting only ultra-violet rays, an observation unit including a lens over the base, and means to maintain an article upon the base in the focal axis of the lens, said means being provided with a fluorescent coating.

SAMUEL G. GORDON.